United States Patent
Wang et al.

(10) Patent No.: US 8,541,070 B2
(45) Date of Patent: Sep. 24, 2013

(54) MEDIA FOR INKJET WEB PRESS PRINTING

(75) Inventors: Yongzhong Wang, Tucson, AZ (US); Xi Zeng, San Diego, CA (US); Kelly Ronk, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/260,360

(22) PCT Filed: Apr. 3, 2009

(86) PCT No.: PCT/US2009/039464
§ 371 (c)(1),
(2), (4) Date: Sep. 25, 2011

(87) PCT Pub. No.: WO2010/114560
PCT Pub. Date: Oct. 7, 2010

(65) Prior Publication Data
US 2012/0034398 A1 Feb. 9, 2012

(51) Int. Cl.
*B41M 5/00* (2006.01)
*B41M 5/52* (2006.01)
*B41M 5/50* (2006.01)
*C04B 41/00* (2006.01)
*B01D 71/02* (2006.01)
*B01D 67/00* (2006.01)

(52) U.S. Cl.
CPC ............ *B41M 5/5218* (2013.01); *B41M 5/52* (2013.01); *B41M 5/506* (2013.01); *B41M 5/5254* (2013.01); *C04B 41/009* (2013.01); *B01D 71/024* (2013.01); *B01D 67/0072* (2013.01)
USPC .................. 428/32.21; 428/32.26; 428/32.28; 428/32.3; 428/32.31; 428/32.34; 428/32.35

(58) Field of Classification Search
CPC ...... B41M 5/5218; B41M 5/52; B41M 5/506; B41M 5/5254; C04B 41/009; B01D 71/024; B01D 67/0072
USPC ........... 428/32.21, 32.26, 32.28, 32.3, 32.31, 428/32.34, 32.35; 427/243
See application file for complete search history.

(56) References Cited

U.S. PATENT DOCUMENTS

| | | | |
|---|---|---|---|
| 6,492,005 B1 * | 12/2002 | Ohbayashi et al. | 428/32.29 |
| 2003/0138604 A1 * | 7/2003 | Landry-Coltrain et al. | 428/195 |
| 2004/0166252 A1 * | 8/2004 | Takashima et al. | 428/32.1 |
| 2006/0014640 A1 | 1/2006 | Tani et al. | |
| 2006/0147659 A1 | 7/2006 | Foley | |
| 2007/0031615 A1 | 2/2007 | Nair et al. | |
| 2008/0057232 A1 | 3/2008 | Leon et al. | |

OTHER PUBLICATIONS

ISK Ishihara Sangyo Kaisha, Ltd. Titanium dioxide Product. 2012.*
International Search Report (ISR) and Written Opinion of the International Searching Authority (ISA) mailed Jan. 4, 2010 from ISA/KR for counterpart PCT Application No. PCT/US2009/039464 (12 pages).

* cited by examiner

*Primary Examiner* — Betelhem Shewareged

(57) ABSTRACT

A media suitable for inkjet web press printing is disclosed herein. The media includes a paper substrate and an ink receptive layer coated onto at least one surface of the paper substrate. The ink receptive layer includes: inorganic pigments; at least one water-based binder; a water-soluble metallic salt; a colorant durability enhancer selected from the group consisting of boric acid, borax, sodium tetraborate, phenyl boronic acid, butyl boronic acid and combinations thereof; and a coefficient of friction (COF) reducer selected from the group consisting of polyethylene wax, paraffin wax, carnauba wax, polypropylene wax, polytetrafluoroethylene wax, and combinations thereof.

12 Claims, No Drawings

MEDIA FOR INKJET WEB PRESS PRINTING

BACKGROUND

High speed inkjet web press printing is a commercial printing technology developed to print on a continuous paper web at rates of hundreds of feet per minute. Printing is done on continuous-web printing presses. The paper web, which is a continuous roll of paper, is conveyed along a paper path that includes stationary inkjet printheads for ejecting a series of ink droplets onto the web. The present disclosure relates to an improved media that is particularly suitable for such high speed web press printing.

DETAILED DESCRIPTION

Print media faces huge challenges when used in high speed web press printing. Poor image quality such as ink bleed coupled with poor black and color optical density are among the main problems encountered. Poor dry time at high speed printing is also a problem. Another problem is "image strike through" when double-sided printing is performed. This is caused by over-penetration of ink as well as poor media opacity. Media coated with a thin layer of silica-based coating has been conventionally used to achieve reduced print bleed and strike-through. Such media has a matte finish and can be used in various inkjet printing systems including large scale jobs on an inkjet web press system. Such coated media, however, is comparatively expensive. For printing limited edition brochures, for example, the matte finished, silica-based coatings can be an appropriate choice for the inkjet web press system. However, in more extensive print jobs in which price is more of a limiting factor, such as printing of textbooks, silica-based coatings could be considered too expensive.

Media coated with a thin layer of clays are relatively inexpensive but tends to have poor print quality and poor print durability. Specifically, this type of media tends to have poor dry rub durability characteristics due to the low smoothness of the coated surface. The inkjet inks that are deposited onto the clay coating surface after printing can be partially rubbed off by an adjacent paper sheet. This will result in color density loss and smear of the printed image.

Many conventional inkjet inks are water-based inks. Some inks used in inkjet web press printing processes are aqueous pigment inks. Pigment inks usually have better longevity (better light fade resistance) than dye inks. Accordingly, pigment inks are preferred for printing on coated and un-coated papers. When pigment inks are printed on papers, especially on coated papers, the inks are settled on the surface of the paper coatings. The inks can be partially rubbed off if rubbed by the adjacent paper sheet. In a printed book, the ink rub-off can result in a loss of color density on the printed page as well as color transfer onto the adjacent page.

In inkjet web press systems, the paper web is transported through a drying oven and then through rollers to be rewound. If the ink on the paper web does not dry quickly, the printed images can be smeared. If the printed paper web is wound into a roll, the roll tension (or pressure) can result in light image impression to other side of paper web. Traditional papers for offset printing are normally surface coated with specialty coating materials and tend to have poor ink absorption and/or slow ink drying characteristics when they are used in an inkjet web press. When water-based inks are printed on paper, especially on coated paper, the inks can be partially or wholly wiped off with water. Hence, a textbook printed with inkjet inks could lose its content if a user accidentally spills a liquid (such as water, juice or coffee) on the textbook page and then wipes the liquid off.

The present disclosure provides an improved media that works well for high speed, inkjet web press printing. An important aspect of the media of the present disclosure is that this media shows excellent dry rub durability for the printed image as well as wet wipe resistance. The improved media includes a paper substrate having an ink receptive layer coated on one or both sides of the paper substrate. The ink receptive layer includes inorganic particles, at least one binder, a water-soluble metallic salt, a colorant durability enhancer, and a coefficient of friction (COF) reducer. The improved media of the present disclosure will now be described in detail below.

Paper Substrate

The paper substrate of the improved media is a paper base containing cellulose fibers. More specifically, the paper base may be produced from chemical pulp, mechanical pulp, thermal mechanical pulp and/or the combination of chemical and mechanical pulp. In one embodiment, the opacity of the paper is 70% or more. In another embodiment, the opacity of the paper is greater than 80%. In one embodiment, the TAPPI brightness of the paper is 70 or more (as measured using TAPPI test method). In yet another embodiment, the brightness of the paper is greater than 80. The paper substrate may have a basis weight ranging from 40 to 250 $g/m^2$, although basis weight outside of this range is possible if desired. The paper substrate may also include other conventional additives such as internal sizing agents and fillers. The internal agents are added to the pulp before it is converted into a paper web or substrate. They may be chosen from conventional internal sizing agents for inkjet papers. The paper base may contain fillers in an amount of about 5% to about 30% by weight. The fillers may be any particular types used in conventional paper making. As a non-limiting example, the fillers may be selected from calcium carbonate, talc, clay, kaolin, titanium dioxide and combinations thereof.

Ink Receptive Layer

The ink receptive layer of the improved media is a coating layer formed by applying a coating composition directly onto an uncoated paper base described above or a pre-coated paper base (i.e., a paper base coated with one or more intermediate coatings). The ink receptive layer is the outermost layer which receives the ink droplets during printing. The essential components of the ink receptive layer include inorganic pigments, at least one binder, a water-soluble metallic salt, a colorant durability enhancer, and a coefficient of friction (COF) reducer.

Inorganic Pigments

The inorganic pigments in the ink receptive layer are particles selected from calcined clays, kaolin clays, calcium carbonate, talc, alumina, silica titanium dioxide, zeolite, and combinations thereof. The inorganic particles include those with plate-like structures. Preferably, at least two different inorganic pigments having different particle sizes are used. The different particle sizes create interstitial voids within the ink receiving layer, thereby making this layer more porous, and hence, more absorbent to the ink. The total amount of pigments ranges from about 60% to about 95% by weight based on the total dry weight of the ink receptive layer. In one embodiment, the total amount of particles ranges from about 70% to about 85% by weight based on the total dry weight of the ink receptive layer.

The ink receptive layer may further contain a small portion of silica particles with large surface area. The large surface area silica can be chosen from fumed silica, precipitated silica and synthetic silica. In one embodiment, the silica has a surface area ranging from 150 to 300 square meters per gram ($m^2/g$). As a non-limiting example, fumed silica may be selected. In an embodiment, the total amount of silica in the ink receptive layer of the present disclosure ranges from 0 to about 3% by dry weight of the layer.

Optional Organic Particles

Optionally, organic particles may be included in the ink receptive layer in addition to the inorganic particles discussed above. Suitable organic particles include polyethylene, polymethyl methacrylate and polytetrafluoroethylene powders, and the combination thereof. If organic particles are used, the total amount of particles (inorganic and organic) is within the range of about 60% to about 95% by weight based on the total dry weight of the ink receptive layer.

Binder

The binder used for the ink receptive layer is selected from water-based binders. Suitable water-based binders include polyvinyl alcohol, styrene-butadiene emulsion, acrylonitrile-butadiene latex, or combinations thereof. In addition to the above binders, other water-based binders may also be added including: starch, which can include oxidized starch, cationized starch, esterified starch, enzymatically denatured starch and the like; gelatin, casein, soybean protein, cellulose derivatives including carboxy-methyl cellulose, hydroxy-ethyl cellulose and the like; acrylic emulsion, vinyl acetate emulsion, vinylidene chloride emulsion, polyester emulsion, and polyvinylpyrrolidone. The amount of the binder in the ink receptive layer ranges from about 4% to about 25% by weight based on the dry weight of the ink receptive layer. In one embodiment, the amount of the binder in the ink receptive layer ranges from about 5 to about 15% by dry weight of the ink receptive layer.

Colorant Durability Enhancer

The colorant durability enhancer used in the ink receptive layer is selected from the group consisting of boric acid, borax, sodium tetraborate, phenyl boronic acid, butyl boronic acid and combinations thereof. Without wishing to be bound by any specific theory, it is believed that these boron-containing compounds function as colorant fixatives that can chemically, physically, and/or electrostatically bind the colorant materials in the inkjet ink at the surface of the paper being printed, and the presence of these boron-derived compounds in the ink receptive layer improves the printed paper's resistance to wet-wipe smear. It has been discovered that the function of these boron-derived compounds as colorant durability enhancers is separate from their cross-linking function. This is evidenced by the fact that cross-linking of the ink receptive layer with other cross-linking agents such as glyoxal did not show improved colorant durability. The boron-derived compounds are more effective as color durability enhancers within a certain range—from about 0.1% to about 20% of the dry weight of the binder in the ink receptive layer.

Metallic Salt

The metallic salt to be used in the ink receptive layer is selected from water-soluble mono- or multi-valent metallic salts. These metallic salts may include cations such as Group I metals, Group II metals, Group III metals, or transitional metals, such as sodium, calcium, copper, nickel, magnesium, zinc, barium, iron, aluminum, and chromium ions, and combinations thereof. An anion species can be chloride, iodide, bromide, nitrate, sulfate, sulfite, phosphate, chlorate, acetate ions, or various combinations. The metallic salt functions as a pigment fixing agent for fixing the ink pigments onto the surface of the media being printed. In one embodiment, the metallic salt is present in an amount ranges from about 5% to about 25% by weight based on the dry weight of the ink receptive layer.

Coefficient of Friction Reducer

Suitable coefficient of friction (COF) reducers include polyethylene wax, paraffin wax, carnauba wax, polypropylene wax, polytetrafluoroethylene wax or various combinations. This wax material is incorporated into the coating composition as an emulsion of fine wax particles. In one embodiment, the fine wax particles have particle sizes in the range from 0.1 to 2.0 microns. The COF reducer is present in an amount from about 0.5% to about 5% by weight based on the dry weight of the ink receptive layer. The presence of the COF reducer, in combination with the other essential components discussed above, significantly improves the "dry rub durability" of the printed paper. "Dry rub durability" refers herein to the ability of the paper to retain the printing ink on its surface after printing so that the printed surface is resistant to ink transfer by dry rubbing, i.e. resistant to ink rub off. Conventionally, the dry rub resistance of the printed paper is improved by coating the printed surface with a varnish overcoat as a protecting layer. However, the additional step of applying this overcoat increases cost. The improved paper disclosed herein can provide superior dry rub resistance without such overcoat.

Coating Additives

In the ink receptive layer, coating additives, such as wetting agents, de-foaming agents, anti-foaming agents and dispersing agents may also be incorporated to improve the ink receptive layer's properties and the application of this layer onto the paper substrate by various coating methods. These additives may be present in an amount ranging from about 0.2% to about 5% by weight based on the dry weight of the ink receptive layer.

The ink receptive layer is formed by applying an aqueous coating composition containing the components discussed above onto at least one surface of the paper substrate using any coating method known in the art, followed by drying. The pH of the ink receptive coating composition ranges from 5 to 7.

Coating Methods for Forming the Ink Receptive Layer

The coating methods for applying the ink receptive coating composition onto the paper substrate include size press, slot die, curtain coating, blade coating and Meyer rod. The size presses include puddle-sized press, film-sized press and the like. The puddle-sized press may be configured as having horizontal, vertical, or inclined rollers. The film-sized press may include a metering system, such as gate-roll metering, blade metering, Meyer rod metering, or slot metering. For some embodiments, a film-sized press with short-dwell blade metering may be used as an application head to apply a coating solution. In another embodiment, a film-sized press is used to apply the coating composition to a paper substrate. The coating composition for forming the ink receptive layer ("ink receptive coating composition") can be applied to the paper substrate off-line or in-line of a paper-making machine. In yet another embodiment, the ink receptive coating composition is applied to the paper substrate by a size press on-line during the surface sizing stage while the paper is being manufactured on a paper machine. One of the main purposes of surface sizing is to add chemicals to the paper fibers in order to improve paper surface strength (low dusting). In general, surface sizing improves paper properties by reinforcing the bonds of fibers with a water-soluble binding agent (usually starch). The coating weight of the applied surface sizing materials is usually low (in the range of 0.2 to 10 grams per square meter per side).

In an embodiment of the present disclosure, the ink receptive coating composition may be applied to a paper substrate with or without other conventional surface sizing chemicals such as starch. In one embodiment, the ink receptive coating composition is applied to a paper substrate without surface sizing chemicals, by using a size press of a paper machine. In this case, the ink receptive coating composition is replacing the conventional surface sizing solution in the paper making process. Thus, the ink receptive coating composition may be applied to a paper substrate during the surface sizing stage through a size press of a paper machine. In an alternative embodiment, the ink receptive coating composition is applied to the paper substrate by by means of a coating machine. As an example, the ink receptive coating composition is applied to a paper substrate by a blade coater.

In yet another embodiment, the paper base may be pre-coated with a clay coating in the paper mill during the paper-making process to make the paper base more receptive to the ink receptive coating, and then the pre-coated paper base is coated with the ink receptive coating.

The ink receptive layer may be formed on one or opposed surfaces of a paper substrate and may have a coating weight of 1 to 25 grams per square meter ($g/m^2$) per side. In one embodiment, the coating weight ranges from 4 to 15 $g/m^2$. A calendaring process may be performed after the ink receptive coating has been dried to improve surface smoothness and gloss. The calendaring process may include super calendar or soft calendar. In one embodiment, the on-line soft calendar in the papermaking machine is used to achieve the smoothness and gloss target.

The coated paper according to the present disclosure exhibits improved properties including excellent dry rub durability, strong wet wipe resistance, quick ink absorption, and highly fixative to colorants and ink pigments on the paper surface. The coated paper preferably has a kinetic coefficient of friction (COF) from 0.2 to 0.4, more preferably, from 0.2 to 0.3, and a dry rub smear of less than 30 mili optical density (mOD) based on a dry rub test, which will be described in more detail in the following Examples.

The following Examples will serve to illustrate representative embodiments and should not be construed as limiting of the disclosure in any way. All parts referred to herein are by weight unless otherwise indicated.

EXAMPLES

Example 1

An ink receptive coating composition was prepared using the following formulation:

| | |
|---|---|
| Polyvinyl alcohol solution (14%) (Celvol 603) | 17.21 parts |
| Defoaming agent (AC-22)[1] | 0.12 parts |
| Covergloss Kaolin clay (66.5% solid)[2] | 27.82 parts |
| Nuclay Kaolin clay (67% solid)[3] | 24.24 parts |
| Calcium chloride solution (40%) | 5.48 parts |
| Styrene butadiene emulsion (STR5401) | 1.32 parts |
| Boric acid solution (4%) | 5.00 parts |
| High-density polyethylene (PE) wax emulsion (Ultralube E-846, 40% solid) | 4.20 parts |
| Water | 14.61 parts | pH: 5.58
[1]A polyol polyester blend supplied by Performance Process Inc.
[2]Supplied by KaMin Performance Minerals; mean particle size around 0.34 microns.
[3]Supplied by BASF; mean particle size around 0.43 microns.

The coating composition was coated with a laboratory blade coater onto a 54 $g/m^2$ chemical pulp-based plain paper and dried with a dryer. The coating weight of the coating layer was about 7 $g/m^2$. The coated paper was then calendared at 3000 pound per square inch (psi) on a laboratory calendar machine. The kinetic COF of the coated paper was 0.23.

Dry Rub Test

The sample in Example 1 was printed on an HP CM8060 Color MFP® printer with pigment ink, and left to be air dried at room temperature for 24 hours. The printed paper in Example 1 was cut into 3×8.5 inch stripe. The unprinted paper portion in Example 1 was cut into 2×4 inch stripe (same coated sample). The printed paper stripe and unprinted paper stripe were mounted on a Sutherland dry rub tester with the unprinted paper (coating surface) and printed paper (printed surface) facing each other. A four-pound weight pressed the unprinted paper onto the printed surface and moved the unprinted stripe to rub the printed surface back and forth 10 times. The amount of colorant transferred to the unprinted surface was then measured as optical density (in unit of mOD). The smaller optical density value means better ink dry rub resistance.

Example 2

An ink receptive coating composition was prepared with the following formulation:

| | |
|---|---|
| Polyvinyl alcohol solution (14%) (Celvol 603) | 17.21 parts |
| Defoaming agent (AC-22)[1] | 0.12 parts |
| Covergloss Kaolin clay (66.5% solid)[2] | 28.50 parts |
| Nuclay Kaolin clay (67% solid)[3] | 24.82 parts |
| Calcium chloride solution (40%) | 5.48 parts |
| Styrene butadiene emulsion (STR5401) | 1.32 parts |
| Boric acid solution (4%) | 5.00 parts |
| High-density PE wax emulsion (Ultralube E-846, 40% solid) | 2.10 parts |
| Water | 15.45 parts | pH: 5.56
[1],[2],[3]As described in Example 1.

The coating composition was coated with a laboratory blade coater onto a 54 $g/m^2$ chemical pulp-based plain paper and dried with a dryer. The coating weight of the coating layer was about 7 $g/m^2$. The coated paper was then calendared at 3000 pound per square inch (psi) on a laboratory calendar machine. The kinetic COF of the coated paper was 0.26.

Dry Rub Test

The sample in Example 2 was printed on an HP CM8060 Color MFP® printer with pigment ink. The sample in Example 2 was dry rubbed and rated according to the same procedure as in Example 1.

Example 3

An ink receptive coating composition was prepared with the following formulation:

| | |
|---|---|
| Polyvinyl alcohol solution (14%) (Celvol 603) | 17.21 parts |
| Defoaming agent (AC-22)[1] | 0.12 parts |
| Covergloss Kaolin clay (66.5% solid)[2] | 28.83 parts |
| Nuclay Kaolin clay (67% solid)[3] | 25.12 parts |
| Calcium chloride solution (40%) | 5.48 parts |
| Styrene butadiene emulsion (STR5401) | 1.32 parts |
| Boric acid solution (4%) | 5.00 parts |
| High-density PE wax emulsion (Ultralube E-846, 40% solid) | 1.05 parts |
| Water | 15.87 parts | pH: 5.58
[1],[2],[3]As described in Example 1.

The coating composition was coated with a laboratory blade coater onto a 54 $g/m^2$ chemical pulp-based plain paper and dried with a dryer. The coating weight of the coating layer was about 7 g/m². The coated paper was then calendared at 3000 pound per square inch (psi) on a laboratory calendar machine. The kinetic COF of the coated paper was 0.32.

Dry Rub Test

The sample in Example 3 was printed on an HP CM8060 Color MFP® printer with pigment ink. The sample in Example 3 was dry rubbed and rated according to the same procedure as in Example 1.

Example 4

An ink receptive coating composition was prepared with the following formulation:

| | |
|---|---|
| Polyvinyl alcohol solution (14%) (Celvol 603) | 17.21 parts |
| Defoaming agent (AC-22)[1] | 0.12 parts |
| Covergloss Kaolin clay (66.5% solid)[2] | 26.06 parts |
| Nuclay Kaolin clay (67% solid)[3] | 22.72 parts |
| Calcium chloride solution (40% solid) | 10.95 parts |
| Styrene butadiene emulsion (STR5401) | 1.32 parts |
| Boric acid solution (4%) | 5.00 parts |
| High-density PE wax (Ultralube E-846, 40% solid) | 4.20 parts |
| Water | 12.42 parts | pH: 5.31
[1],[2],[3]As described in Example 1.

The coating composition was coated with a laboratory blade coater onto a 54 g/m² chemical pulp-based plain paper and dried with a dryer. The coating weight of the coating layer was about 7 g/m². The coated paper was then calendared at 3000 pound per square inch (psi) on a laboratory calendar machine. The kinetic COF of the coated paper was 0.24.

Dry Rub Test

The sample in Example 4 was printed on an HP CM8060 Color MFP® printer with pigment ink. The sample in Example 4 was dry rubbed and rated according to the same procedure as in Example 1.

Example 5

An ink receptive coating composition was prepared with the following formulation:

| | |
|---|---|
| Polyvinyl alcohol solution (14%) (Celvol 603) | 17.21 parts |
| Defoaming agent (AC-22)[1] | 0.12 parts |
| Covergloss Kaolin clay (66.5% solid)[2] | 26.74 parts |
| Nuclay Kaolin clay (67% solid)[3] | 23.30 parts |
| Calcium chloride solution (40%) | 10.95 parts |
| Styrene butadiene emulsion (STR5401) | 1.32 parts |
| Boric acid solution (4%) | 5.00 parts |
| High-density PE wax (Ultralube E-846, 40% solid) | 2.10 parts |
| Water | 13.26 parts | pH: 5.43
[1],[2],[3]As described in Example 1.

The coating composition was coated with a laboratory blade coater onto 54 g/m² chemical pulp-based plain paper and dried with a dryer. The coating weight of the layer was about 7 gsm. The coated paper was then calendared at 3000 pound per square inch (psi) on a laboratory calendar machine. The kinetic COF of the coated paper was 0.26.

Dry Rub Test

The sample in Example 5 was printed on an HP CM8060 Color MFP® printer with pigment ink. The sample in Example 5 was dry rubbed and rated according to the same procedure as Example 1.

Example 6

An ink receptive coating composition was prepared with the following formulation:

| | |
|---|---|
| Polyvinyl alcohol solution (14%) (Celvol 603) | 17.21 parts |
| Defoaming agent (AC-22)[1] | 0.12 parts |
| Covergloss Kaolin clay (66.5% solid)[2] | 27.07 parts |
| Nuclay Kaolin clay (67%)[3] | 23.60 parts |
| Calcium chloride solution (40%) | 10.95 parts |
| Styrene butadiene emulsion (STR5401) | 1.32 parts |
| Boric acid solution (4%) | 5.00 parts |
| High-density PE wax (Ultralube E-846, 40%) | 1.05 parts |
| Water | 13.68 parts | pH: 5.30
[1],[2],[3]As described in Example 1.

The coating composition was coated with a laboratory blade coater onto a 54 g/m² chemical pulp-based plain paper and dried with a dryer. The coating weight of the coating layer was about 7 g/m². The coated paper was then calendared at 3000 pound per square inch (psi) on a laboratory calendar machine. The kinetic COF of the coated paper was 0.29.

Dry Rub Test

The sample in Example 6 was printed on an HP CM8060 Color MFP® printer with pigment ink. The sample in Example 6 was dry rubbed and rated according to the same procedure as in Example 1.

Comparative Example

An ink receptive layer coating composition was prepared with the following formulation:

| | |
|---|---|
| Polyvinyl alcohol solution (19%) (Mowiol 6-98) | 3.47 parts |
| Polyvinyl alcohol solution (14%) (Mowiol 15-79) | 12.50 parts |
| Defoaming agent (Foamaster VF)[1] | 0.12 parts |
| Covergloss Kaolin clay (66.5% solid)[2] | 19.75 parts |
| Hydralux 91 Kaolin clay (100%)[3] | 12.32 parts |
| Calcined clay (100%) | 8.79 parts |
| Calcium chloride solution (40%) | 10.92 parts |
| Styrene butadiene emulsion (Rovene4040) | 1.32 parts |
| Boric acid solution (4%) | 5.00 parts |
| Water | 25.81 parts | pH: 5.50
[1]A petroleum derivative blend supplied by Cognis Corporation.
[2]Supplied by KaMin Performance Minerals; mean particle size around 0.34 microns.
[3]Supplied by J. M. Huber Corporation; mean particle size around 0.43 microns.

The coating composition was coated with a laboratory blade coater onto a 54 g/m² chemical pulp-based plain paper and dried with a dryer. The coating weight of the coating layer was about 7 g/m². The coated paper was then calendared at 3000 pound per square inch (psi) on a laboratory calendar machine. The kinetic COF of the coated paper was 0.44.

Dry Rub Test

The sample in the Comparative Example was printed on an HP CM8060 Color MFP® printer with pigment ink. The sample in the Comparative Example was dry rubbed and rated according to the same procedure as in Example 1.

TABLE 1

Test Results Summary

| Examples | Kinetic COF | Dry Rub Smear (mOD) |
| --- | --- | --- |
| Example 1 | 0.23 | 5.0 |
| Example 2 | 0.26 | 8.3 |
| Example 3 | 0.32 | 9.7 |
| Example 4 | 0.24 | 4.3 |
| Example 5 | 0.26 | 8.0 |
| Example 6 | 0.29 | 8.3 |
| Comparative Example 1 | 0.44 | 18.3 |

As the results in Table 1 show, the paper samples from Examples 1-6 have kinetic COF values that are significantly less than that of the comparative sample. Furthermore, the results show that the smaller the kinetic COF of the coated paper, the smaller the dry rub smear mOD (i.e., the better the dry rub resistance).

While several embodiments have been described in detail, it will be apparent to those skilled in the art that the disclosed embodiments may be modified. Therefore, the foregoing description is to be considered exemplary rather than limiting.

What is claimed is:

1. A media for inkjet web press printing comprising:
   a paper substrate comprising cellulose fibers;
   an ink receptive layer coated on at least one surface of the paper substrate, said ink receptive layer comprising a coating composition that comprises:
   inorganic pigments including at least two different clays with different particle sizes;
   at least one water-based binder;
   a water-soluble metallic salt;
   a colorant durability enhancer selected from the group consisting of boric acid, borax, sodium tetraborate, phenyl boronic acid, butyl boronic acid and combinations thereof; and
   a coefficient of friction (COF) reducer selected from the group consisting of polyethylene wax, paraffin wax, carnauba wax, polypropylene wax, polytetrafluoroethylene wax, and combinations thereof.

2. The media of claim 1, wherein the inorganic pigments are present in an amount ranging from 60% to 95% by weight based on the total dry weight of the ink receptive layer;
   said at least one water-based binder is present in amount ranging from 4% to 25% by weight based on the dry weight of the ink receptive layer;
   said water-soluble metallic salt is present in an amount ranging from 5% to 25% by weight based on the dry weight of the ink receptive layer;
   said colorant durability enhancer is present in an amount ranging from 0.1% to 20% of the dry weight of the at least one binder; and
   said COF reducer is present in an amount ranging from 0.5% to 5% by weight based on the dry weight of the ink receptive layer.

3. The media of claim 1, wherein said inorganic pigments are selected from the group consisting of calcined clays, kaolin clays, calcium carbonate, talc, alumina, silica titanium dioxide, zeolite, and combinations thereof.

4. The media of claim 1, wherein said at least one water-based binder is selected from the group consisting of polyvinyl alcohol, styrene-butadiene emulsion, acrylonitrile-butadiene latex, and combinations thereof.

5. The media of claim 4, wherein said at least one water-based binder includes two different binders.

6. The media of claim 1, wherein said water-soluble metallic salt is a mono-valent or multi-valent metallic salt having metal cation selected from the group consisting of Group I metals, Group II metals, Group III metals, transitional metals, and combinations thereof, and anion selected from the group consisting of chloride, iodide, bromide, nitrate, sulfate, sulfite, phosphate, chlorate, acetate, and combination thereof.

7. A method for forming a media for inkjet web press printing comprising:
   (a) preparing a coating composition, the coating composition comprising:
   inorganic pigments including at least two different clays with different particle sizes;
   at least one water-based binder;
   a water-soluble metallic salt;
   a boron-containing compound selected from the group consisting of boric acid, borax, sodium tetraborate, phenyl boronic acid, butyl boronic acid and combinations thereof; and
   an emulsion of wax particles selected from the group consisting of polyethylene wax particles, paraffin wax particles, carnauba wax particles, polypropylene wax particles, polytetrafluoroethylene wax particles, and combinations thereof; and
   (b) applying the coating composition to at least one surface of a paper substrate.

8. The method of claim 7, wherein said inorganic pigments are selected from the group consisting of calcined clays, kaolin clays, calcium carbonate, talc, alumina, silica titanium dioxide, zeolite, and combinations thereof.

9. The method of claim 7, wherein said at least one water-based binder is selected from the group consisting of polyvinyl alcohol, styrene-butadiene emulsion, acrylonitrile-butadiene latex, and combinations thereof.

10. The method of claim 7, wherein said water-soluble metallic salt is a mono-valent or multi-valent metallic salt having metal cation selected from the group consisting of Group I metals, Group II metals, Group III metals, transitional metals, and combinations thereof, and anion selected from the group consisting of chloride, iodide, bromide, nitrate, sulfate, sulfite, phosphate, chlorate, acetate, and combination thereof.

11. The method of claim 7, wherein the pH of the coating composition ranges from 5 to 7.

12. A coated media formed by the method of claim 7.

* * * * *